United States Patent
Huo

(10) Patent No.: US 11,816,028 B2
(45) Date of Patent: *Nov. 14, 2023

(54) HOST SIDE MEMORY ADDRESS MANAGEMENT

(71) Applicant: Micron Technology, Inc., Boise, ID (US)

(72) Inventor: Binbin Huo, Sauerlach (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,757

(22) Filed: Apr. 6, 2022

(65) Prior Publication Data

US 2022/0300411 A1    Sep. 22, 2022

Related U.S. Application Data

(63) Continuation of application No. 16/951,986, filed on Nov. 18, 2020, now Pat. No. 11,301,372.

(51) Int. Cl.
*G06F 12/02* (2006.01)
*G06F 12/0882* (2016.01)
*G06F 13/16* (2006.01)
*G06F 12/0868* (2016.01)

(52) U.S. Cl.
CPC ...... *G06F 12/0246* (2013.01); *G06F 12/0868* (2013.01); *G06F 12/0882* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | |
|---|---|---|
| 9,558,112 B1 | 1/2017 | Borchers |
| 2011/0093646 A1 | 4/2011 | Koka et al. |
| 2021/0034536 A1 | 2/2021 | Kim et al. |

FOREIGN PATENT DOCUMENTS

CN    111538682 A    8/2020

OTHER PUBLICATIONS

Chinese Patent Office, "Office Action," issued in connection with Chinese Patent Application No. 202111355970.X dated Nov. 18, 2022 (9 pages) (4 pages of English Translation and 5 pages of Original Document).

*Primary Examiner* — Kevin Verbrugge
(74) *Attorney, Agent, or Firm* — Holland & Hart LLP

(57) ABSTRACT

Methods, systems, and devices for host side memory address management are described. In some examples, a host system may identify a read request that includes a logical address of a block of a memory device. The read request may be associated with a descriptor indicating a page of a cache of the host system. The host system may determine to assign a descriptor to a page of the cache, and may recycle one or more pages of the cache. In some examples, the host system may determine whether the page indicated by the descriptor includes a mapping between the logical address and a physical address of the memory device, and may issue a read command to the memory device based on the page including the mapping.

20 Claims, 9 Drawing Sheets

HOST SIDE MEMORY ADDRESS MANAGEMENT

CROSS REFERENCE

The present Application for Patent is a continuation of U.S. patent application Ser. No. 16/951,986 by Huo, entitled "HOST SIDE MEMORY ADDRESS MANAGEMENT" filed Nov. 18, 2020, assigned to the assignee hereof, and is expressly incorporated by reference in its entirety herein.

FIELD OF TECHNOLOGY

The following relates generally to one or more systems for memory and more specifically to host side memory address (e.g., logical to physical address mapping) management.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
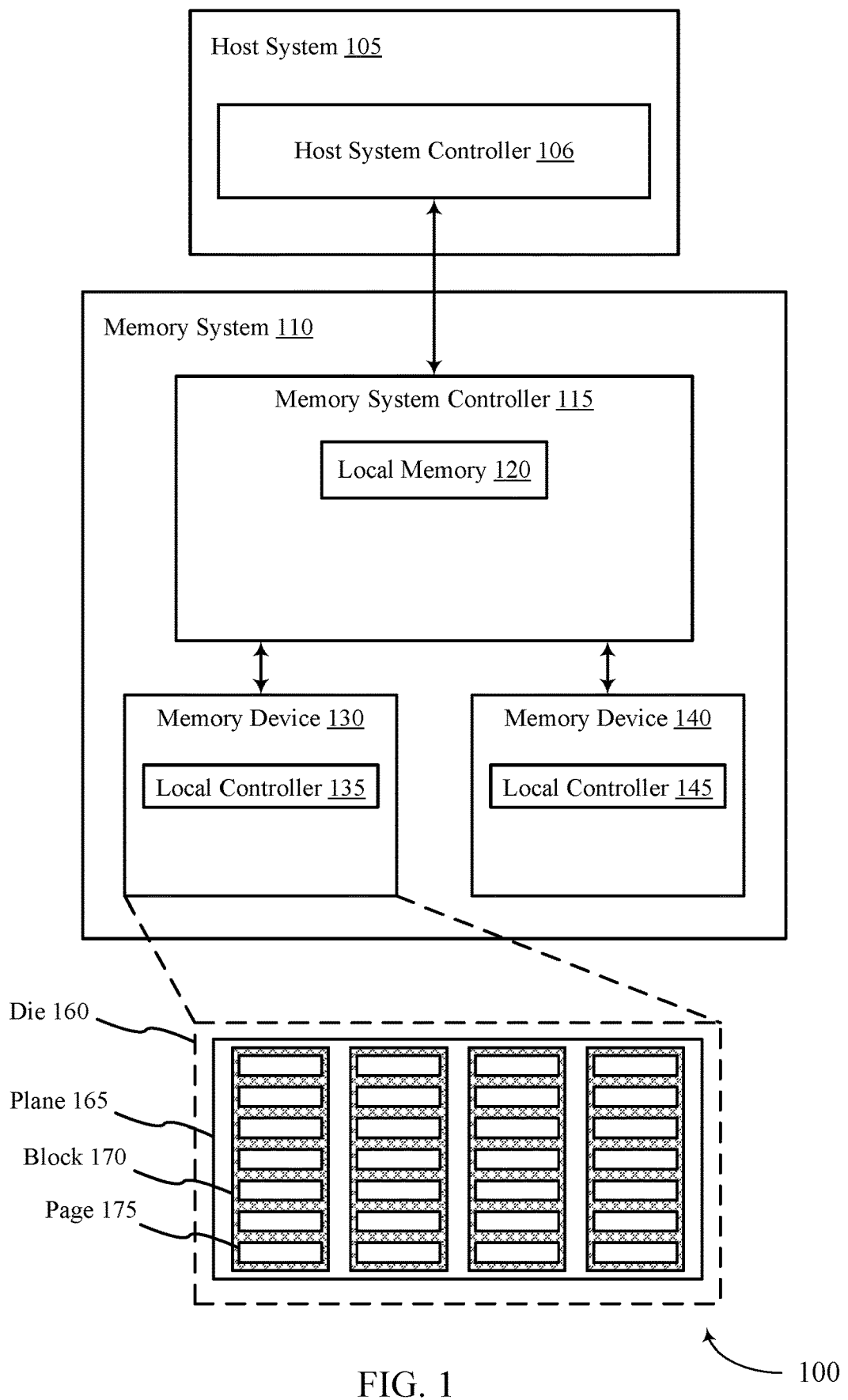
FIG. 1 illustrates an example of a system that supports host side memory address management in accordance with examples as disclosed herein.

High capacity storage systems may perform address translation between logical addressing and physical addressing. A memory controller of a memory system may maintain a table (e.g., a logical-to-physical (L2P) table) that has a complete mapping between all logical addresses and physical addresses of the memory system. Some memory systems include a capability of performing a host performance booster (HPB) operation that may be activated (e.g., activated per region) when a quantity of reads satisfies a threshold value. A HPB operation may include sending portions of the L2P table (e.g., corresponding to regions satisfying the threshold value) to a host system and allowing the host system to use the physical addresses for commands.

The host system may use a cache to store the L2P tables. Due to sizing constraints, the cache may be unable to store all the L2P tables associated with the memory system. Instead, because the memory system may include a controller and several independent logical units (LUNs), the host system may include a finite quantity of L2P memory for each LUN (e.g., different portions of the cache may be reserved for each LUN). The L2P memory for the LUNs may be managed separately, and thus may result in the host system running out of L2P memory for one or more LUNs, while memory space for other LUNs is unused. Accordingly, a host system having a cache configured for globally managing L2P tables may be desirable.

A host system having a cache configured for globally managing L2P tables is described herein. In some examples, a host system may include a cache that includes common page space for storing L2P tables. Each LUN of the memory system may be associated with a set of descriptors corresponding to each block of the LUN, and the descriptors may be mapped to pages of the cache. Each descriptor may include attributes of the page such as the page address (of the cache), the page state, and/or a timer indicating the duration the page has been opened. When a read request indicating a logical block address (LBA) of the memory system is received, a descriptor associated with the read command (e.g., associated with a block of the LUN) may be identified. The descriptor may be mapped to a page of the cache, which may include a mapping between the LBA and a physical address of the memory system. In such instances, a read command may be issued to the memory system using the physical address stored to the page of the cache.

The host system may maintain one or more tables (e.g., chains) for managing active and inactive pages of the cache. In some instances, the host system may map descriptors to inactive (e.g., free) pages and may store mappings between LBAs and physical addresses to the respective pages. In other instances, the host system may recycle active (e.g., used) pages of the cache in order to free space for new mappings. Thus the host system may utilize the cache for storing L2P tables associated with various LUNs of a memory system, which may prevent the host system from running out of or underutilizing the L2P memory.

Features of the disclosure are initially described in the context of systems and block diagrams as described with reference to FIGS. 1 through 3. Features of the disclosure are described in the context process flow diagrams as described with reference to FIGS. 4-6. These and other features of the disclosure are further illustrated by and described with reference to an apparatus diagram and flowcharts that relate to host side memory address management as described with reference to FIGS. 7-9.

FIG. 1 is an example of a system 100 that supports host side memory address management in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support host side memory address management. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

In some examples, the host system 105 may identify a read request that is associated with a LBA of the memory system 110 and a descriptor. For example, the host system 105 may identify a read request associated with a LBA and a descriptor indicating a page of a cache of the host system 105. The host system 105 may determine whether the page of the cache includes a mapping between the LBA and a physical address of the memory system 110. If the page includes such a mapping, the host system 105 may issue a read command that includes the physical address of the memory system 110 (e.g., corresponding to a physical address of the memory device 130 or memory device 140).

Additionally or alternatively, the host system 105 may manage a list (e.g., a table) of active descriptors and may recycle one or more pages of the cache. For example, the host system 105 may recycle one or more active pages based on a characteristic of the associated descriptor (e.g., based on the descriptor including dirty and/or stale data, based on the descriptor being active for the longest duration, etc.). The host system 105 may recycle the page by unmapping the page from the active descriptor (e.g., or other mechanism to effectively recycle the page). The host system 105 may then map the page (e.g., the recycled page) to a new descriptor (e.g., a descriptor associated with a present read request). By utilizing the methods described herein, the host system 105 may avoid running out of memory for storing L2P tables of one or more LUNs while having unused memory space for storing L2P tables of other LUNs.

Figure 2:
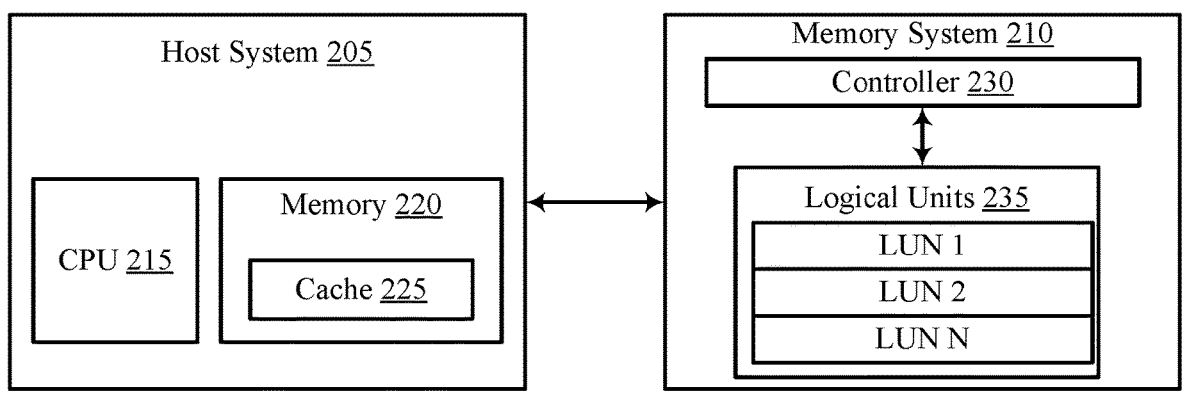
FIG. 2 illustrates an example of a memory system that supports host side memory address management in accordance with examples as disclosed herein.

FIG. 2 illustrates an example of a system 200 that supports host side memory address management in accordance with examples as disclosed herein. The system 200 may include a host system 205 and a memory system 210. In some examples, the host system 205 may be an example of the host system 105 and the memory system 210 may be an example of the memory system 110 as described with reference to FIG. 1. The host system 205 may include a cache 225 (e.g., a portion of the memory 220 of the host system 205 that is configured as cache storage) that includes a common page space for storing L2P tables. The page space may be common to each of the logical units 235 (LUNs) of the memory system 210. Because the page space is common to each of the logical units 235, the host system 205 may globally manage the L2P tables based on one or more conditions of each logical unit. Accordingly, the host system 205 may avoid running out of memory for storing L2P tables of one or more LUNs and also avoid having unused memory space for storing L2P tables of other LUNs.

In some examples, the host system 205 may be configured to perform access operations (e.g., read operations, write operations) on the memory system 210. The memory system 210 may include one or more memory cells (e.g., one or more non-volatile memory cells) that are organized into logical units 235. For example, each logical unit 235 (e.g., LUN1, LUN2, LUN-N) may include a quantity of blocks. Each block may include a respective set of pages, and each page may include a set of memory cells, such as a set of non-volatile memory cells (e.g., flash memory cells). When performing an access operation, the host system 205 may determine a physical address of a memory cell (e.g., of a row of memory cells) based on a logical address (e.g., a logical block address (LBA)) associated with the read request.

In some instances, the host system 205 may perform one or more access commands according to a HPB operation. As described herein, an HPB operation is generally activated to load L2P mapping per region (e.g., per block) when a quantity of reads on the region satisfies a threshold or when the host system 205 receives a notification from the memory system 210 to load L2P mapping for a region. When the quantity of reads on the region satisfies the threshold, the host system 205 may store mappings between LBAs and physical addresses of the region to a local L2P table (e.g., may receive the L2P table for the region from the memory system 210), which may be stored at the cache 225. The cache may be or may include static random-access memory (SRAM). When subsequent access operations are performed on the region, the host system 205 may access the associated memory cells using the physical addresses stored to the L2P table (e.g., using the mapping between a LBA and associated physical address stored to the L2P table).

As described herein, the cache 225 may include a common page space for storing L2P tables. The common page space may store L2P tables for each of the logical units 235 of the memory system 210. Accordingly, during an access operation, the CPU 215 (e.g., a L2P memory manager of the host system 205) may identify a LBA associated with a read request. In some examples, the CPU 215 may also identify a descriptor associated with the read request that indicates a page of the cache 225. The descriptor may be associated with a logical unit 235 associated with the read request. For example, a descriptor may be associated with logical unit LUN 1.

The page of the cache 225 indicated by the descriptor may be for storing a L2P mapping (e.g., a L2P table, a L2P table entry) for a block, and the CPU 215 may determine whether the L2P table entry includes a mapping between the LBA associated with the read request and an address (e.g., physical address) of the memory system 210. If the L2P entry includes an associated mapping, the host system 205 may issue a read command to the memory system 210 using the associated mapping stored in the page of the cache 225 (e.g., the physical address). The read command may be received and/or processed by the controller 230, and the memory cell(s) associated with the physical address may be accessed.

The CPU 215 may determine whether the cache 225 includes a mapping between a LBA associated with the read request and a physical address of the memory system 210. For example, the CPU 215 may identify a LBA and descriptor associated with a read request and may determine that the cache 225 does not include a mapping between the LBA associated with the read request and a physical address of the memory system 210 (e.g., the block of the descriptor is not associated with a page of the cache 225). When the cache 225 does not include a L2P mapping between the LBA and a physical address, the CPU 215 may assign an inactive page of the cache 225 (e.g., an available page, an empty page) for a mapping between the LBA and an associated physical address. In such examples, the CPU 215 may perform an address translation and store the mapping to the available page of the cache 225. Accordingly, if the CPU 215 identifies a subsequent read request associated with the same descriptor and/or LBA, the host system 205 may issue a read command to the memory system 210 using the mapping stored to the page (e.g., using the physical address associated with the LBA that is stored to the page of the cache 225). That is, if the CPU 215 determines that the cache 225 includes a mapping between a LBA associated with a read request and a physical address of the memory system, the host system 205 may issue a read command to the memory system 210 using the mapping. Additionally or alternatively, when the cache 225 does not include a L2P mapping between the LBA and a physical address, the CPU 215 may determine whether the cache 225 includes any inactive pages. If the cache 225 includes one or more inactive pages, the CPU may assign a mapping between the LBA of the present read request and a physical address of the memory system 210 to one of the inactive pages. If the cache 225 does not include one or more inactive pages, the CPU 215 may recycle one or more active pages based on a characteristic of the descriptor associated with the page (e.g., based on the descriptor including dirty and/or stale data, based on the descriptor being active for the longest duration, etc.). The CPU 215 may recycle the page by unmapping the descriptor from the page (e.g., or by another mechanism effectively recycling the page) and assigning a mapping between the LBA of the present read request and a physical address of the memory system 210. Accordingly, if the CPU 215 identifies a subsequent read request associated with the same descriptor and/or LBA, the host system 205 may issue a read command to the memory system 210 using the mapping stored to the page (e.g., using the physical address associated with the LBA that is stored to the page of the cache 225 during the recycling operation). Utilizing the methods described herein, the host system 205 may avoid running out of memory for storing L2P tables of one or more LUNs and avoid having unused memory space for storing L2P tables of other LUNs.

Figure 3:
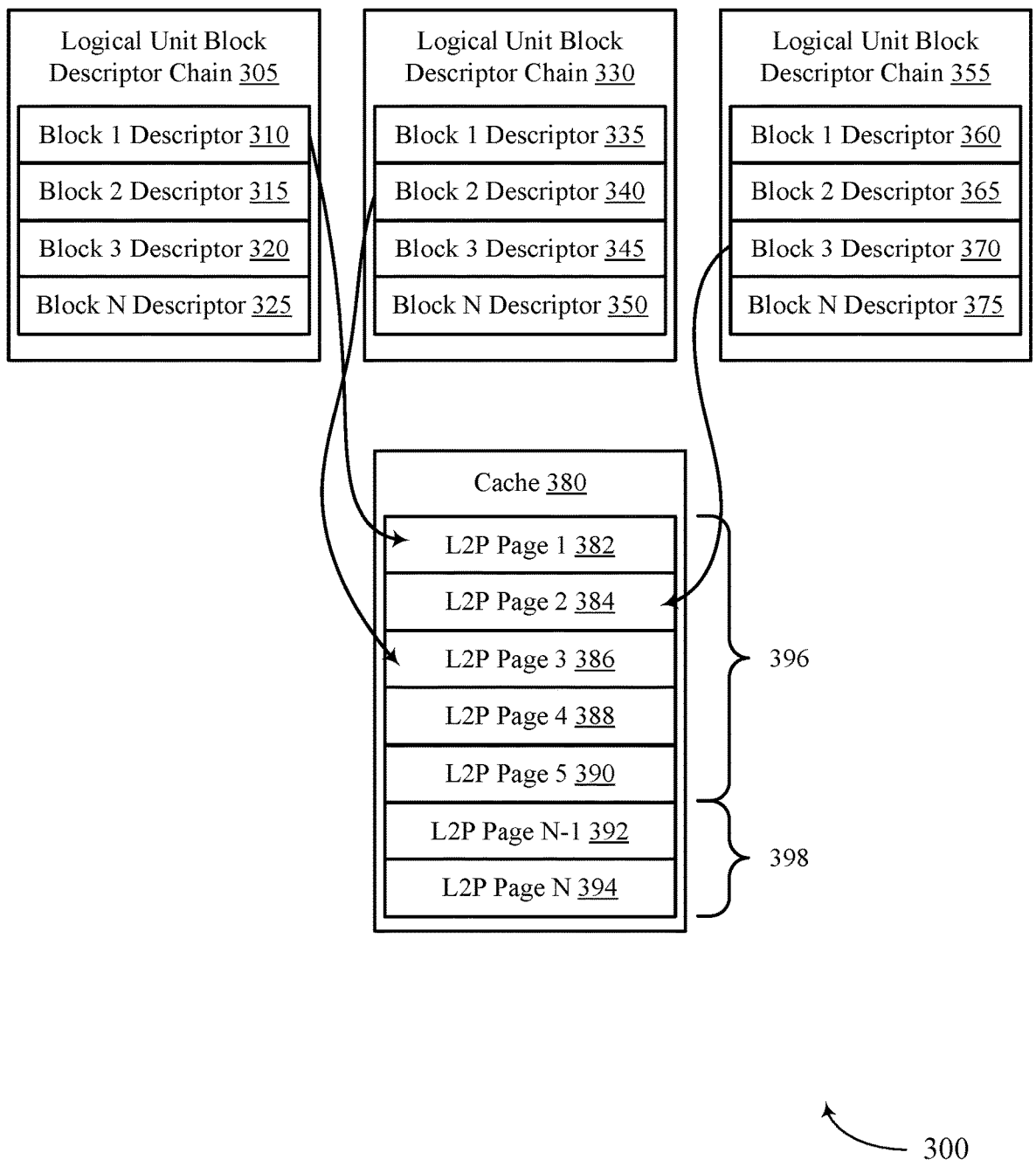
FIG. 3 illustrates an example of a block diagram that supports host side memory address management in accordance with examples as disclosed herein.

FIG. 3 illustrates an example of a block diagram 300 that supports host side memory address management in accordance with examples as disclosed herein. The block diagram 300 may illustrate logical unit block descriptor chains associated with different LUNs of a memory system (e.g., different logical units 235 of the memory system 210 as described with reference to FIG. 2) and the common page spaces of a cache 380. In some examples, the cache 380 may be an example of the cache 225 as described with reference to FIG. 2 and may include active pages 396 (e.g., used pages 396) and inactive pages 398 (e.g., unused pages 398). Different block descriptors of the logical unit block descriptor chains may indicate respective pages of the cache 380 that store mappings between LBAs and physical addresses of a memory device.

The logical unit block descriptor chains may each include a set of descriptors associated with the respective blocks of a LUN of a memory device. For example, the logical unit block descriptor chain 305 may include block 1 descriptor 310, block 2 descriptor 315, block 3 descriptor 320, and block N descriptor 325 (where N represents a positive integer). The size of the pages of the cache 380 may be defined by one LUN block. Thus each logical unit block descriptor chain may have a descriptor for each block of a LUN of a memory device.

In some examples, a descriptor may refer to a set of attributes associated with a block of a LUN. For example, each descriptor may identify the attributes shown below in Table 1.

TABLE 1

| Attributes | Description |
| --- | --- |
| L2P page address in L2P memory (LPA) | Indicates a location of the L2P page in the cache |
| L2P page state (LPS) | Indicates a L2P page state (e.g., dirty, clean, none) |
| Opened Timer | Indicates how long the L2P page of the block has been activated |

As shown in Table 1, a descriptor may include an indication of a location of the associated page of the cache 380, whether the associated page is available or unavailable and/or whether the associated page includes clean or dirty data, or a timer indicating a duration that the associated page has been activated. For exemplary purposes only, the block 1 descriptor 310 of the logical unit block descriptor chain 305 may be associated with the L2P page 1 382 of the cache 380, the block 2 descriptor 340 of the logical unit block descriptor chain 330 may be associated with the L2P page 3 386 of the cache 380, and the block 3 descriptor 370 of the logical unit block descriptor chain 355 may be associated with the L2P page 2 384 of the cache 380.

A host system (e.g., the host system 205 as described with reference to FIG. 2) may identify a read request that is associated with a LBA and a descriptor. For example, a host system may identify a read request associated with a LBA and the block 1 descriptor 310. Accordingly, the host system may determine whether the block 1 descriptor 310 is associated with the L2P page 1 382 of the cache 380 (e.g., by using the LPA of the descriptor). The host system may then determine whether the L2P page 1 382 of the cache 380 includes a mapping between the LBA and a physical address of the memory device. If the L2P page 1 includes such a mapping, the host system may issue a read command that includes the physical address of the memory system.

In some examples, the other attributes of a descriptor may be used in determining whether a page of the cache 380 includes a mapping between a LBA and a physical address and/or issuing a read command to the memory system. For example, if the L2P page state (LPS) is "none" then the descriptor may not be associated with a page of the cache 380. Additionally or alternatively, if the LPS is "dirty" then the associated page of the cache 380 may be understood as having invalid information, and if the LPS is "clean" then a read command may be issued to the memory device according to the mapping stored to the associated page of the cache 380. In some cases, the host system may determine when a block descriptor becomes dirty. For example, the host system may determine when some (e.g., over a threshold) or all of the data associated with the block has been changed, discarded, or erased. Additionally or alternatively, the memory system may indicate to the host system that the L2P table associated with a block descriptor is dirty (e.g., based on write or unmap operations on the block). Moreover, the opened timer may be used during a recycle operation to identify pages of the cache 380 that have been active for the longest duration (e.g., relative to other pages).

As discussed herein, the cache 380 may include active pages 396 and inactive pages 398. For example, L2P page N−1 392 and L2P page N 394 may represent inactive pages 398 of the cache 380, where N is a positive integer. When a host system identifies a descriptor of a read request that is not associated with a page of the cache 380, the host system may retrieve the L2P table associated with the block from the memory system. Based on the condition of retrieving the L2P table, the host system may store the mapping to an inactive page 398. In some instances, the cache 380 may not include any inactive pages, which may result in the host system performing a recycle operation to unmap one or more of the active pages 396. Utilizing the methods described herein, a host system may continually use and/or recycle pages of the cache 380 for storing mappings between LBAs and physical addresses of a memory system.

Figure 4:
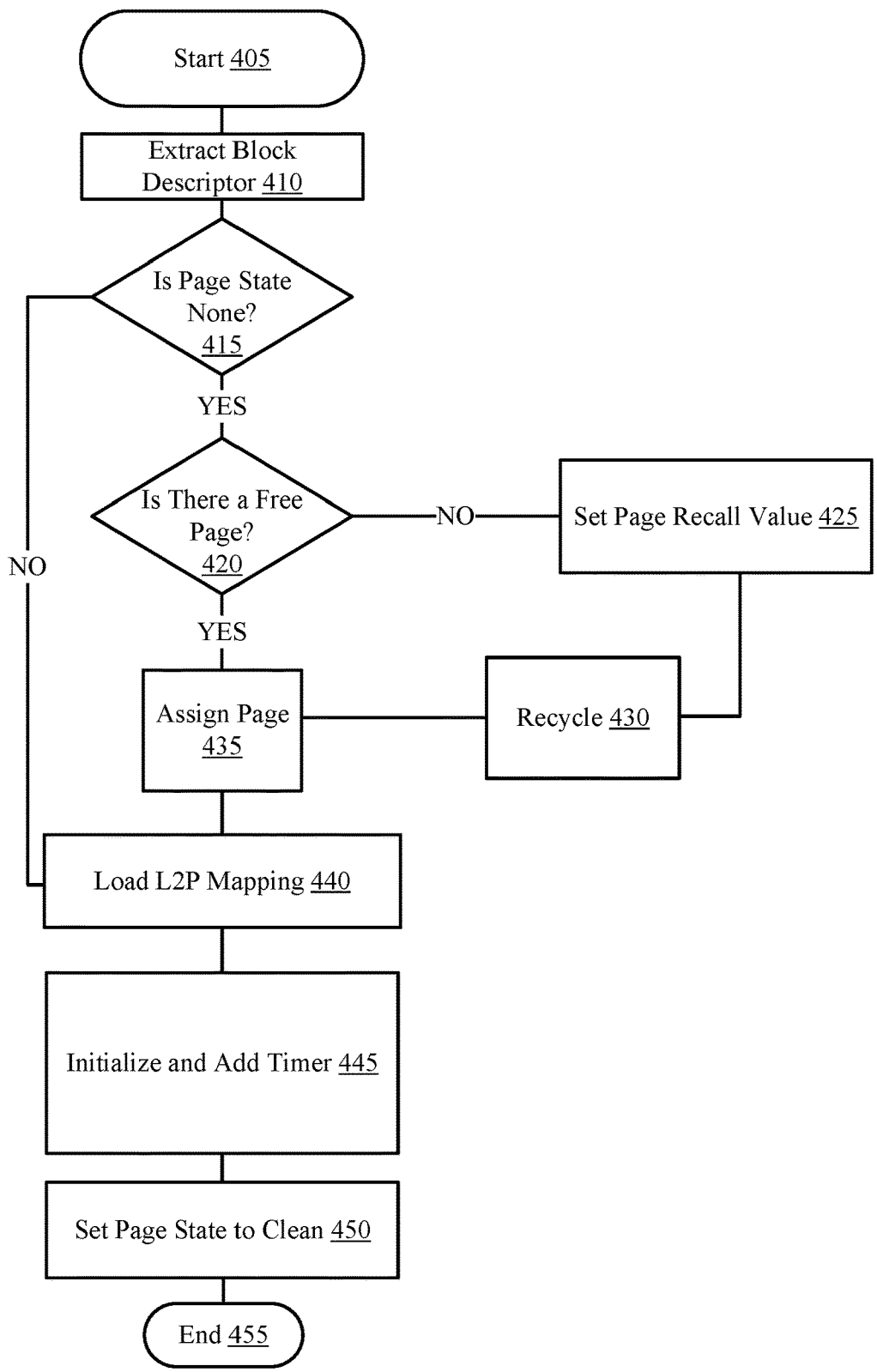
FIG. 4-6 illustrate examples of process flow diagrams that support host side memory address management in accordance with examples as disclosed herein.

FIG. 4 illustrates an example of a process flow diagram 400 that supports host side memory address management in accordance with examples as disclosed herein. In some examples, the process flow diagram 400 may illustrate one or more operations that occur when loading or attempting to load a L2P mapping (e.g., from a page of a cache 380 as described with reference to FIG. 3). The process flow diagram 400 may illustrate loading a mapping stored to an active page, assigning a mapping to an inactive page, and/or recycling one or more inactive pages. The mapping between a LBA and physical address that is stored to an active page of a cache may be used to issue read commands to an associated memory system.

At 405, an L2P load operation may begin. In some examples, the operation may be associated with a HPB operation, which may begin when a host system identifies a read request. The L2P load operation may begin when the host system determines to load an L2P table, which may occur when a quantity of reads satisfies a threshold value. The host system may determine to load an L2P table when the quantity of reads on a LUN or a block satisfies the threshold value or when the host system receives a notification from the memory system to load the L2P mapping of a region. For example, the host system may determine to load an L2P table in response to determining (e.g., detecting) that a quantity of reads associated with a particular LUN satisfies a threshold value. In some examples, the host system may determine to load an L2P table in response to determining that a quantity of reads associated with a particular LUN (e.g., that occur within a duration) satisfies the threshold value.

In some examples, after a threshold value is satisfied and the host system determines to perform a HPB operation, the host system may identify a read request and may perform a HPB read (e.g., based on the threshold value being satisfied). The read request may be associated with a LBA and a descriptor (e.g., a block descriptor). As described herein, the descriptor may indicate a location of a page of a cache, among other attributes. The location of the page of the cache may include a mapping between the LBA and a physical address of the memory system. The descriptor may also include a page state (LPS) and a timer to indicate how long the page has been active.

At 410, the host system may extract the block descriptor from the read request. The block descriptor may be extracted in order to identify its attributes. For example, the block descriptor may be extracted so that the CPU of the host system (e.g., the L2P memory manager of the host system) may identify the page address of the cache (e.g., the LPA), the page state (LPS), and/or a value of the timer.

At 415, the host system may determine whether the LPS of the block descriptor is "none." As described herein, if the LPS of the block descriptor is "none" then the descriptor may not be associated with a page of the cache. Accordingly, when the LPS is not "none," the L2P load operation may progress to loading the L2P mapping (e.g., at 440). If the LPS is "none," the block descriptor may not be associated with a page of the cache and the host system may determine whether the cache includes any free (e.g., inactive) pages.

At 420, the host system may determine whether the cache includes any free (e.g., inactive) pages. If it is determined that the cache does not include any free pages, the host system may ultimately perform a recycle operation to free a page of the cache. If it is determined that the cache includes one or more free pages, the host system may map the block descriptor to the inactive page (e.g., at 435).

At 425, the host system may set a page recall value based on determining that the cache does not include any free pages. By setting the page recall value (e.g., to a "1", to a high value), a recycle operation may be configured for the block descriptor. Accordingly, the host system may add the block descriptor to a queue for performing a recycle operation.

At 430, the host system my perform a recycle operation. Performing a recycle operation may unmap one or more active pages of the cache. Unmapping a page may effectively free the page, thus allowing the host system to map a block descriptor to the freed page. The recycle operation may recycle pages to reuse the pages for block descriptors with a page recall value asserted (e.g., set to a logic "1"). Additional details relating to a recycle operation are described herein, including at least FIG. 6.

At 435, the host system may map a block descriptor to an inactive page of the cache. In some examples, the page may have been free and not subject to a recycle operation (e.g., if there was an inactive page at 420). In other examples, the page may have been freed by a recycle operation (e.g., at 430). The host system may track a quantity of inactive pages, and thus may reduce a quantity of inactive pages upon mapping the block descriptor to the inactive page at 435. Upon receiving a subsequent read request associated with the same block descriptor and/or LBA, the host system may issue a read command using the physical address stored to the page at 435.

At 440, the host system may load an L2P mapping from the memory system. In some examples, the extracted descriptor may have not included the LPS "none" and the page may be loaded after 415. In other examples, the page may be loaded after mapping the descriptor to the page (and receiving a subsequent read request for the descriptor and/or LBA). In some examples, the L2P mapping may be loaded prior to or during a HPB read, which may occur when a quantity of reads satisfies a threshold value (e.g., when a quantity of reads performed on a block satisfies a threshold value). Upon satisfying the threshold value, the L2P mapping may be loaded, and the host system may subsequently issue read commands using the physical address stored to the page of the cache. As described herein, the physical address may correspond to the LBA of the read request.

At 445, the host system may initiate a timer associated with the block descriptor and may add the block descriptor to an active block descriptor chain based on loading the mapping. As discussed herein, the timer may be used during a recycle operation to determine the page (or pages) having been active for the longest duration. In other examples, the block descriptor may be added to an active block descriptor chain, which may aid in identifying the active descriptors when issuing read commands and/or performing recycle operations.

At 450, the host system may set the LPS of the block descriptor to "clean." As described herein, if the LPS is "clean" then a read command may be issued to the memory device according to the mapping stored to the associated page of the cache (e.g., upon receiving a subsequent read request associated with the block descriptor and/or LBA).

At 455, an L2P load operation may end. In some examples, the host system may identify and/or process subsequent read commands after performing an L2P load operation. The host system may identify and/or process the subsequent read commands according to the steps illustrated by the process flow diagram 400 and described with reference to FIG. 4.

Figure 5:
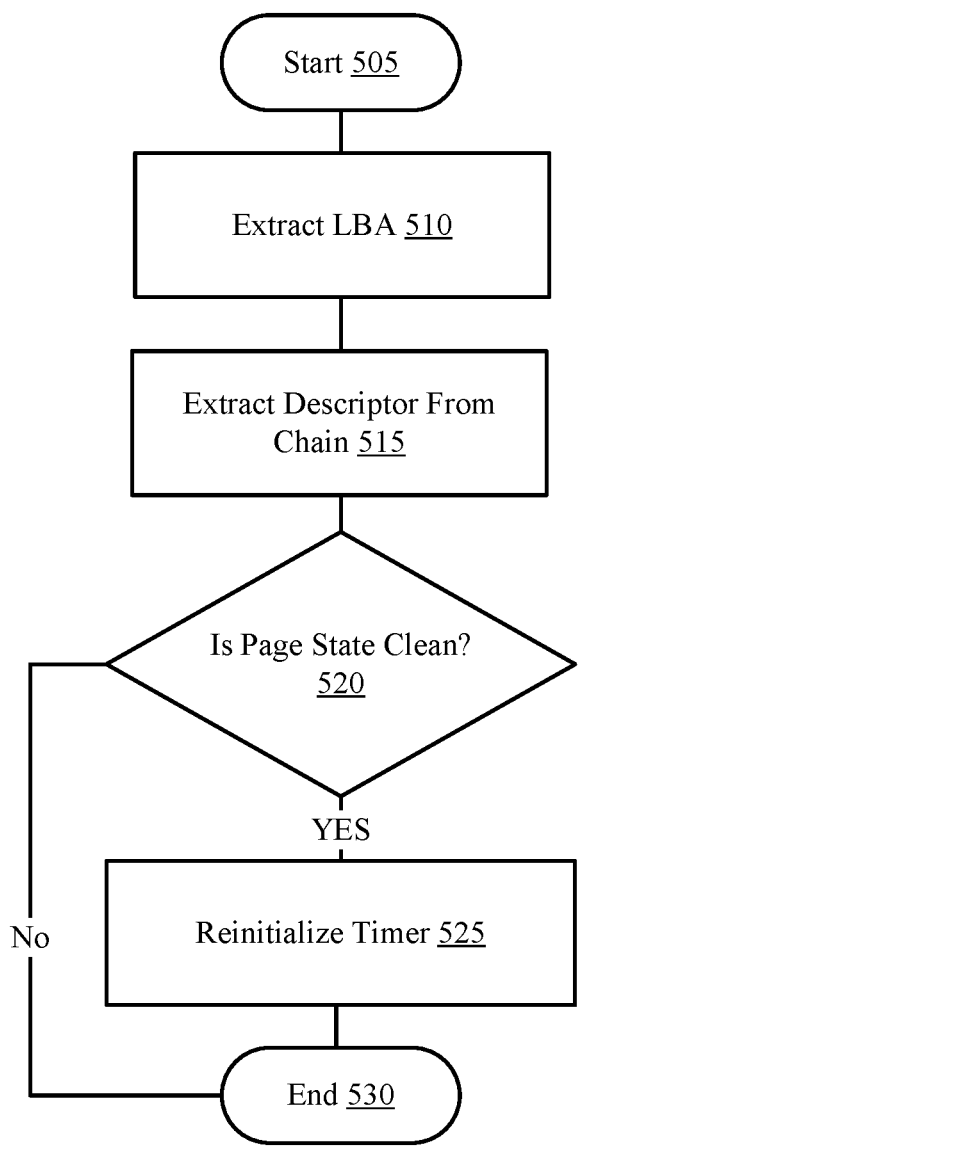

FIG. 5 illustrates an example of a process flow diagram 500 that supports host side memory address management in accordance with examples as disclosed herein. In some examples, the process flow diagram 500 may illustrate one or more operations that occur when identifying a read request by a host system. The process flow diagram 500 may illustrate resetting an active timer of a block descriptor that is mapped to a page of a cache (e.g., a page of a cache 380 as described with reference to FIG. 3) to prevent the page from being recycled. By preventing the page from being recycled, the L2P mapping stored to the page may be used to issue subsequent read commands to an associated memory device.

At 505, an L2P timer refresh operation may begin. In some examples, the operation may begin when a host system identifies a read request. In some examples, a read request may be associated with a LBA and a descriptor (e.g., a block descriptor). As described herein, the descriptor may indicate a location of a page of a cache, among other attributes. The location of the page of the cache may include a mapping between the LBA and a physical address of the memory device. The descriptor may also include a page state (LPS) and a timer to indicate how long the page has been active. In the event that the block descriptor is mapped to a page of the cache (e.g., the block descriptor is active), the block descriptor may be stored to an active block descriptor chain.

At 510, the host system may extract the LBA from the read request. The LBA may be used to determine whether the associated descriptor is active (e.g., and stored to the active block descriptor chain). If the associated descriptor is active, the associated page of the cache may store a mapping between the LBA and a physical address of the memory device that can be used to issue a read command.

At 515, the host system may extract the block descriptor from the active block descriptor chain according to the LBA. The block descriptor may be extracted in order to identify its attributes. For example, the block descriptor may be extracted so that the CPU of the host system (e.g., the L2P memory manager of the host system) may identify the page address of the cache (e.g., the LPA), the page state (LPS), and/or a value of the timer.

At 520, the host system may determine whether the LPS of the block descriptor is "clean." If the LPS is "clean" then the associated page of the cache may include data (e.g., a mapping) that is up-to-date. Stated another way, a "clean" LPS may indicate that the corresponding page of the cache includes an up-to-date mapping between a LBA and physical address of the memory device. In such examples, the host system may perform a HPB read using the L2P table associated with the descriptor (e.g., the host system may perform a read operation using the physical address from the L2P table).

At 525, the host system may reinitialize the timer associated with the block descriptor based on the LPS indicating a "clean" state. By reinitializing the timer, the associated page of the cache may be less susceptible to a recycle operation because a recycle operation may be performed on a page associated with a block descriptor having been active for the longest duration. Accordingly, reinitializing the timer may allow for subsequent read requests associated with block descriptor to be processed by the host system.

At 530, an L2P timer refresh operation may end. In some examples, the operation may end if the page state of the block descriptor is not "clean" (e.g., at 520). In such examples, the operation may end without the timer being reinitialized and the host device may perform a normal read operation using the LBA associated with the read request. In other examples, the operation may end after the timer is reinitialized (e.g., at 525). As described herein, when the timer is reinitialized (e.g., when the page state is "clean," the host system may perform a HPB read using the L2P table associated with the descriptor and the host system may identify and/or process the subsequent read commands according to the steps illustrated by the process flow diagram 400 and described with reference to FIG. 4.

Figure 6:
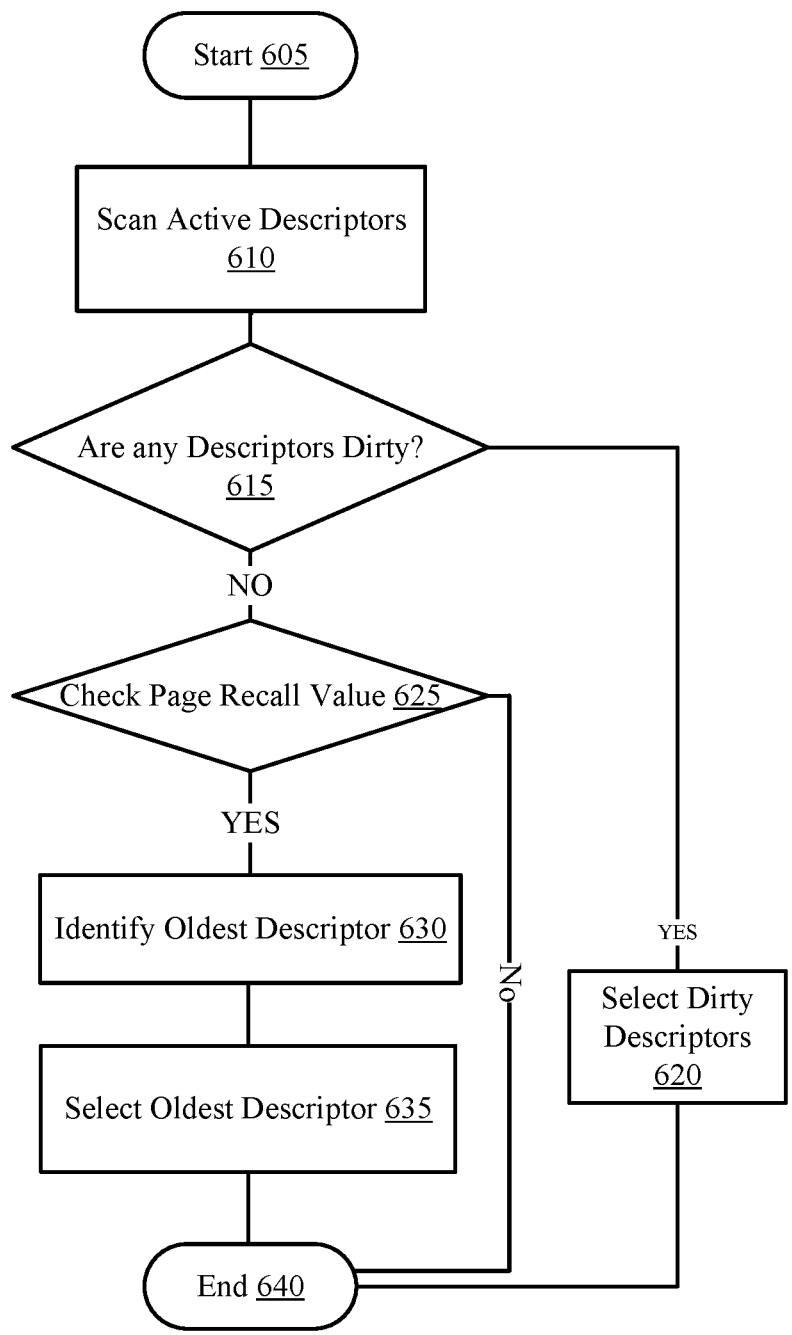

FIG. 6 illustrates an example of a process flow diagram 600 that supports host side memory address management in accordance with examples as disclosed herein. In some examples, the process flow diagram 600 may illustrate one or more operations that occur when performing a recycle operation. The process flow diagram 500 may illustrate performing a recycle operation (e.g., at 430) as described with reference to FIG. 4. Thus the operations illustrated by the process flow diagram 600 may occur during an L2P load operation as described with reference to FIG. 4. By recycling a page of a cache, the page may become inactive and may thus be mapped to a block descriptor associated with a read request.

At 605, an L2P recycle operation may begin. In some examples, the operation may begin after a host system determines to load a page based on read operations (e.g., upon a quantity of read operations reaching a threshold value). For example, a block may be enabled for HPB operations when a quantity of reads satisfies a threshold value and the L2P table for the block may be requested from the memory system. Thus the L2P recycle operation may be associated with a HPB operation, which may begin when a host system identifies a read request and upon the host system determining that the associated block descriptor is not mapped to a page of a cache and that the cache does not include any inactive (e.g., free) pages. Thus a recycle operation may be performed to free one or more pages of the cache, which may be used to map to the block descriptor.

At 610, the host system may scan active block descriptors. As described herein, active block descriptors may be stored to an active block descriptor chain. The active descriptor chain may be scanned to identify one or more attributes of the active block descriptors.

At 615, the host system may determine if any of the active block descriptors' LPS is "dirty." If "dirty," then the mapping between the LBA and physical address of the memory device, stored to the associated page of the cache, may not be up-to-date. Active block descriptors having a "dirty" LPS may be selected for unmapping, which may erase the contents of the page of the cache it is associated with. If any of the active block descriptors' LPS is not "dirty," then the mapping between the LBA and physical address of the memory device, stored to the associated page of the cache, may be up-to-date and the host system may progress to identify the active block descriptors having a "clean" LPS.

At 620, the host system may select a block descriptor having a "dirty" LPS. Any block descriptors having a "dirty" LPS may be selected for being unmapped. Unmapping the block descriptor may erase the contents of the page of the cache it is associated with, which may allow the page of the cache to be mapped with a different descriptor (e.g., a descriptor associated with a present read request).

At 625, the host system may check a page recall value (e.g., a page recall value set at 425 as described with reference to FIG. 4). The page recall value may have been set based on determining whether the cache includes any free pages. For example, the page recall value (e.g., a "1" to a high value) may indicate a recycle operation for the block descriptor. Accordingly, the host system may add the block descriptor to a queue for performing a recycle operation At 630, the host system may identify the oldest active block descriptor having a "clean" LPS. The host system may identify the oldest active block descriptor by identifying a value of the timer of each block descriptor. The oldest block descriptor may have the timer indicating the largest value (e.g., the longest duration). As described herein, the timer indicating the largest value may identify which block descriptor has been active the longest without its timer being reset (e.g., as described with reference to FIG. 5).

At 635, the host system may select the block descriptor having the timer indicating the largest value. The block descriptor having been active for the longest duration may be selected for being unmapped. Unmapping the block descriptor may erase the contents of the page of the cache it is associated with, which may allow the page of the cache to be mapped with a different descriptor (e.g., a descriptor associated with a present read request).

At 640, an L2P recycle operation may end. In some examples, the operation may end once the page(s) of the cache that are associated with the selected descriptor(s) is unmapped (e.g., erased). Once erased, the host system may map a different block descriptor to the page (e.g., at 435 as described with reference to FIG. 4).

Figure 7:
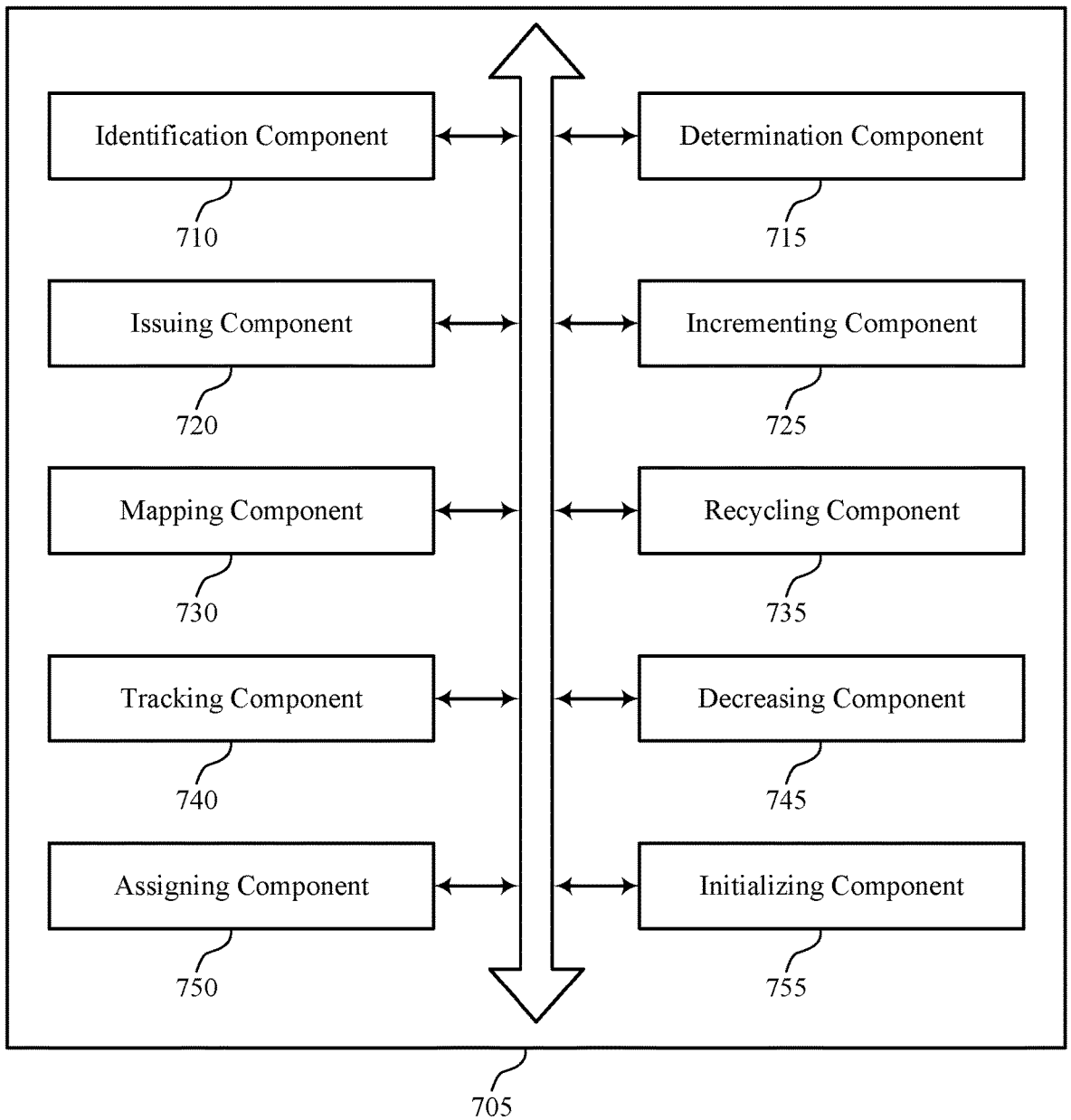
FIG. 7 shows a block diagram of a host system that supports host side memory address management in accordance with aspects of the present disclosure.

FIG. 7 shows a block diagram 700 of a host system 705 that supports host side memory address management in accordance with examples as disclosed herein. The host system 705 may be an example of aspects of a host system as described with reference to FIGS. 1 through 6. The host system 705 may include an identification component 710, a determination component 715, an issuing component 720, an incrementing component 725, a mapping component 730, a recycling component 735, a tracking component 740, a decreasing component 745, an assigning component 750, and an initializing component 755. Each of these modules may communicate, directly or indirectly, with one another (e.g., via one or more buses).

The identification component 710 may identify a descriptor indicating a page of a cache of the host system based on a read request for data from a block of a logical unit of a memory system, where the read request includes a logical address associated with the block and the cache includes page space for mappings between logical addresses and physical addresses of the memory system. In some examples, the identification component 710 may identify a second read request for data from a second block of a second logical unit of the memory system. In some examples, the identification component 710 may identify a second descriptor based on a logical address associated with the second block.

In some examples, the identification component 710 may identify a page state indicated by the second descriptor based on determining that the second descriptor is not associated with a valid page. In some examples, the identification component 710 may identify the descriptor associated with the block based on identifying the read request, the descriptor indicating that the logical address does not correspond to a page of the cache of the host system. In some examples, the identification component 710 may identify a second read request for data from a second block of a second logical unit of the memory system. In some examples, the identification component 710 may identify a set of active pages of the cache based on identifying the second read request, where each active page of the set of active pages is associated with a respective descriptor.

In some cases, the memory system is associated with a set of logical units, where each logical unit is associated with a quantity of descriptors configured to be stored in the cache of the host system. In some cases, the cache of the host system includes a single shared space for the pages configured to store address tables associated with the set of logical units of the memory system. In some cases, the descriptor identifies an address of the page space of the page of the cache of the host system.

The determination component 715 may determine whether the page indicated by the descriptor includes a mapping between the logical address associated with the block and a physical address of the memory system. In some examples, the determination component 715 may determine that a descriptor associated with a block is not associated with a page of a cache of the host system based on identifying a read request for data from the block of a logical unit of a memory system, the read request including a logical address associated with the block.

In some examples, the determination component 715 may determine whether the second descriptor is associated with a valid page of the cache. In some examples, the determination component 715 may determine whether the second descriptor indicates the first page state. In some examples, the determination component 715 may determine whether a value of the read counter satisfies a threshold value based on incrementing the read counter, where a third read command is issued to the memory system based on the value of the read counter failing to satisfy the threshold value. In some examples, the determination component 715 may determine whether the second descriptor indicates a second page state based on the value of the read counter satisfying the threshold value.

In some examples, the determination component 715 may determine a page state of a second page indicated by a second descriptor. In some examples, the determination component 715 may determine a value of a timer of a second descriptor. In some examples, the determination component 715 may determine whether the value of the timer of the second descriptor satisfies a threshold value.

In some examples, determining whether a page space of the cache includes an inactive page may be based on determining that the descriptor associated with the read request is not associated with a page of the cache, where the page space of the cache is shared across a set of logical units. In some examples, determining whether the cache includes an inactive page may be based on determining that the second descriptor does not indicate the second page state.

The issuing component 720 may issue a read command to the memory system including the physical address of the memory system based on determining that the page space indicated by the descriptor includes the mapping between the logical address associated with the block and the physical address of the memory system. In some examples, the issuing component 720 may issue a second read command to the memory system based on the second descriptor indicating a first page state.

The incrementing component 725 may increment a read counter associated with the second descriptor based on determining that the second descriptor does not indicate the first page state, where the read counter indicates a quantity of read operations performed on the second block.

The mapping component 730 may map the descriptor to a page of the cache based on determining that the page was inactive. In some examples, the mapping component 730 may map the second descriptor to the recycled page.

In some examples, map the second descriptor to an inactive page of the cache based on determining that the cache includes at least one inactive page.

The recycling component 735 may recycle a page of the cache of the host system based on determining that the cache does not include an inactive page. In some examples, the recycling component 735 may recycle the second page of the cache associated with the second descriptor based on the second descriptor indicating a first page state, where the descriptor is mapped to the second page based on recycling the second page. In some examples, the recycling component 735 may recycle a second page of the cache associated with the second descriptor based on the timer satisfying the threshold value, where the descriptor is mapped to the second page based on recycling the second page.

The tracking component 740 may track a quantity of inactive pages of the cache.

The decreasing component 745 may decrease the tracked quantity of inactive pages of the cache based on mapping the descriptor to the page of the cache.

The assigning component 750 may assign a second page state to the page of the cache based on mapping the descriptor to the page of the cache, where the second page state indicates that the page includes a mapping between a logical address and physical address of the memory system.

The initializing component 755 may initialize a timer associated with the descriptor based on mapping the descriptor to the page of the cache, where the timer indicates a duration the page is active, where the page is available to be recycled based on the timer satisfying a threshold value.

Figure 8:
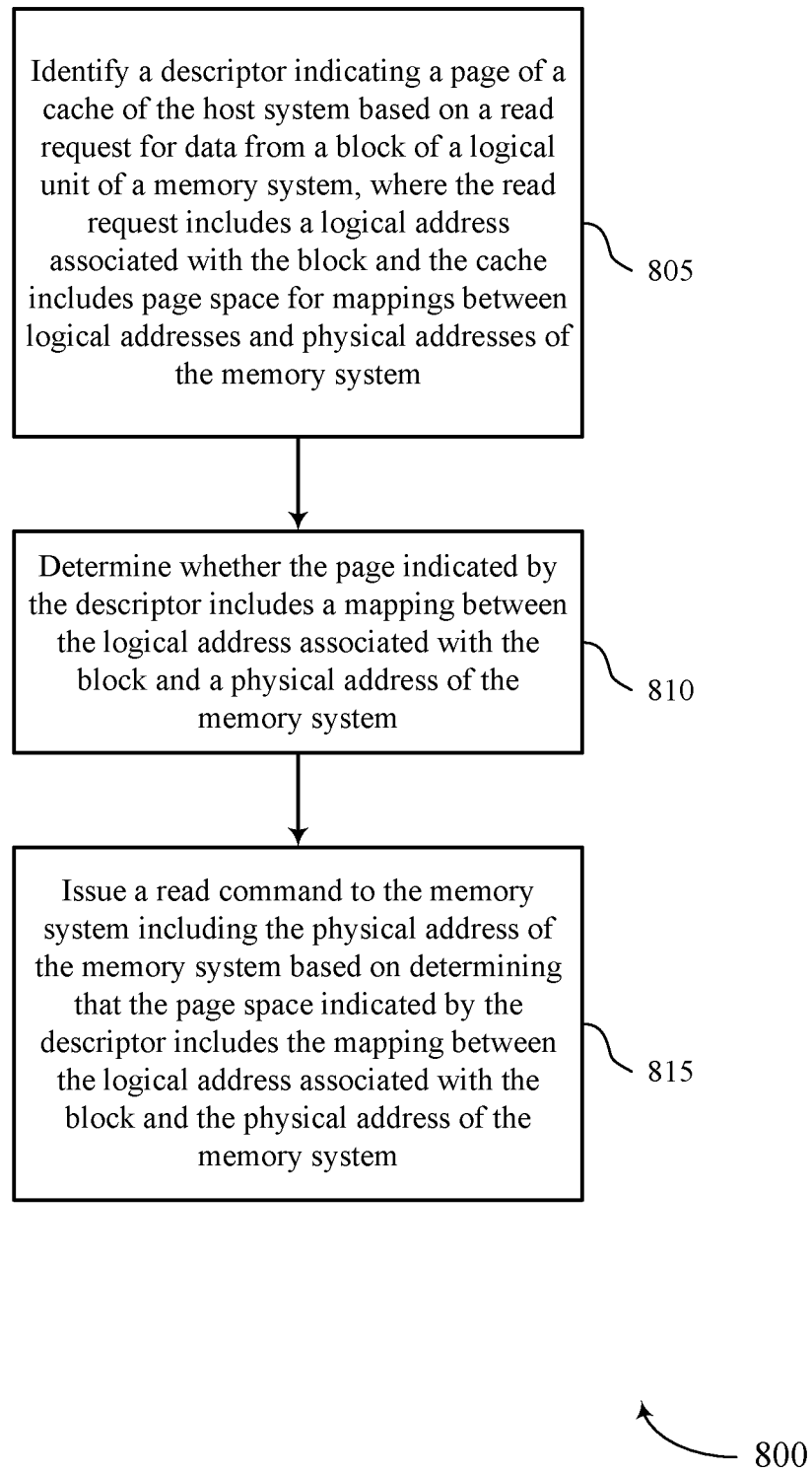
FIGS. 8 and 9 show flowcharts illustrating a method or methods that support host side memory address management in accordance with examples as disclosed herein.

FIG. 8 shows a flowchart illustrating a method or methods 800 that supports host side memory address management in accordance with aspects of the present disclosure. The operations of method 800 may be implemented by a host system or its components as described herein. For example, the operations of method 800 may be performed by a host system as described with reference to FIG. 7. In some examples, a host system may execute a set of instructions to control the functional elements of the host system to perform the described functions. Additionally or alternatively, a host system may perform aspects of the described functions using special-purpose hardware.

At 805, the host system may identify a descriptor indicating a page of a cache of the host system based on a read request for data from a block of a logical unit of a memory system, where the read request includes a logical address associated with the block and the cache includes page space for mappings between logical addresses and physical addresses of the memory system. The operations of 805 may be performed according to the methods described herein. In some examples, aspects of the operations of 805 may be performed by an identification component as described with reference to FIG. 7.

At 810, the host system may determine whether the page indicated by the descriptor includes a mapping between the logical address associated with the block and a physical address of the memory system. The operations of 810 may be performed according to the methods described herein. In some examples, aspects of the operations of 810 may be performed by a determination component as described with reference to FIG. 7.

At 815, the host system may issue a read command to the memory system including the physical address of the memory system based on determining that the page space indicated by the descriptor includes the mapping between the logical address associated with the block and the physical address of the memory system. The operations of 815 may be performed according to the methods described herein. In some examples, aspects of the operations of 815 may be performed by an issuing component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for identifying a descriptor indicating a page of a cache of the host system based on a read request for data from a block of a logical unit of a memory system, where the read request includes a logical address associated with the block and the cache includes page space for mappings between logical addresses and physical addresses of the memory system. The apparatus may include features, means, or instructions (e.g., a non-transitory computer-readable medium storing instructions executable by a processor) for determining whether the page indicated by the descriptor includes a mapping between the logical address associated with the block and a physical address of the memory system, and issuing a read command to the memory system including the physical address of the memory system based on determining that the page space indicated by the descriptor includes the mapping between the logical address associated with the block and the physical address of the memory system.

Some examples of the method 800 and the apparatus described herein may further include operations, features, means, or instructions for identifying a second read request for data from a second block of a second logical unit of the memory system, identifying a second descriptor based on a logical address associated with the second block, and determining that the second descriptor may be not associated with a valid page of the cache.

Some examples of the method 800 and the apparatus described herein may further include operations, features, means, or instructions for identifying a page state indicated by the second descriptor based on determining that the second descriptor is not associated with a valid page, and issuing a second read command to the memory system based on the second descriptor indicating a first page state.

Some examples of the method 800 and the apparatus described herein may further include operations, features, means, or instructions for determining whether the second descriptor does indicates the first page state and incrementing a read counter associated with the second descriptor based on determining that the second descriptor does not indicate the first page state, where the read counter indicates a quantity of read operations performed on the second block. Some examples of the method 800 and the apparatus described herein may further include operations, features, means, or instructions for determining whether a value of the read counter satisfies a threshold value based on incrementing the read counter, where a third read command may be issued to the memory system based on the value of the read counter failing to satisfy the threshold value.

Some examples of the method 800 and the apparatus described herein may further include operations, features, means, or instructions for determining whether the second descriptor indicates a second page state based on the value of the read counter satisfying the threshold value, determining whether the cache includes an inactive page based on determining that the second descriptor does not indicate the second page state, and mapping the second descriptor to an inactive page of the cache based on determining that the cache includes at least one inactive page.

Some examples of the method 800 and the apparatus described herein may further include operations, features, means, or instructions for recycling a page of the cache of the host system based on determining that the cache does not include an inactive page, and mapping the second descriptor to the recycled page.

In some examples of the method 800 and the apparatus described herein, the memory system may be associated with a set of logical units, where each logical unit may be associated with a quantity of descriptors configured to be stored in the cache of the host system.

In some examples of the method 800 and the apparatus described herein, the cache of the host system includes a single shared space for the pages configured to store address tables associated with the set of logical units of the memory system.

In some examples of the method 800 and the apparatus described herein, the descriptor identifies an address of the page space of the page of the cache of the host system.

Figure 9:
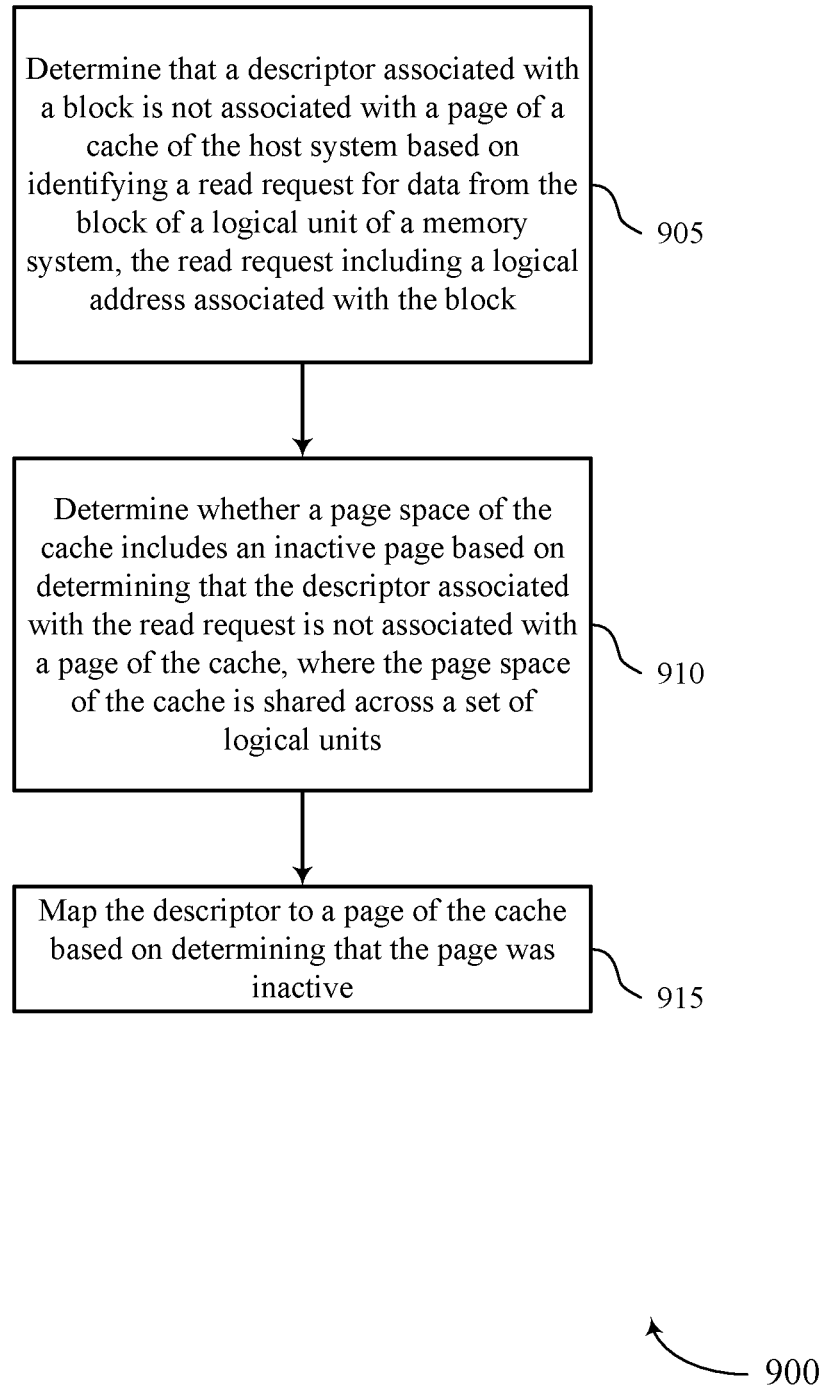

FIG. 9 shows a flowchart illustrating a method or methods 900 that supports host side memory address management in accordance with aspects of the present disclosure. The operations of method 900 may be implemented by a host system or its components as described herein. For example, the operations of method 900 may be performed by a host system as described with reference to FIG. 7. In some examples, a host system may execute a set of instructions to control the functional elements of the host system to perform the described functions. Additionally or alternatively, a host system may perform aspects of the described functions using special-purpose hardware.

At 905, the host system may determine whether a descriptor associated with a block is associated with a page of a cache of the host system based on identifying a read request for data from the block of a logical unit of a memory system, the read request including a logical address associated with the block. The operations of 905 may be performed according to the methods described herein. In some examples, aspects of the operations of 905 may be performed by a determination component as described with reference to FIG. 7.

At 910, the host system may determine whether a page space of the cache includes an inactive page based on determining that the descriptor associated with the read request is not associated with a page of the cache, where the page space of the cache is shared across a set of logical units. The operations of 910 may be performed according to the methods described herein. In some examples, aspects of the operations of 910 may be performed by a determination component as described with reference to FIG. 7.

At 915, the host system may map the descriptor to a page of the cache based on determining that the page was inactive. The operations of 915 may be performed according to the methods described herein. In some examples, aspects of the operations of 915 may be performed by a mapping component as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for determining whether a descriptor associated with a block is associated with a page of a cache of the host system based on identifying a read request for data from the block of a logical unit of a memory system, the read request including a logical address associated with the block, determining whether a page space of the cache includes an inactive page based on determining that the descriptor associated with the read request is not associated with a page of the cache, where the page space of the cache is shared across a set of logical units, and mapping the descriptor to a page of the cache based on determining that the page was inactive.

Some examples of the method 900 and the apparatus described herein may further include operations, features, means, or instructions for identifying the descriptor associated with the block based on identifying the read request, the descriptor indicating that the logical address does not correspond to a page of the cache of the host system.

Some examples of the method 900 and the apparatus described herein may further include operations, features, means, or instructions for identifying a second read request for data from a second block of a second logical unit of the memory system, and identifying a set of active pages of the cache based on identifying the second read request, where each active page of the set of active pages may be associated with a respective descriptor.

Some examples of the method 900 and the apparatus described herein may further include operations, features, means, or instructions for determining a page state of a second page indicated by a second descriptor, and recycling the second page of the cache associated with the second descriptor based on the second descriptor indicating a first page state, where the descriptor may be mapped to the second page based on recycling the second page.

Some examples of the method 900 and the apparatus described herein may further include operations, features, means, or instructions for determining a value of a timer of a second descriptor, determining whether the value of the timer of the second descriptor satisfies a threshold value, and recycling a second page of the cache associated with the second descriptor based on the timer satisfying the threshold value, where the descriptor may be mapped to the second page based on recycling the second page.

Some examples of the method 900 and the apparatus described herein may further include operations, features, means, or instructions for tracking a quantity of inactive pages of the cache, and decreasing the tracked quantity of inactive pages of the cache based on mapping the descriptor to the page of the cache.

Some examples of the method 900 and the apparatus described herein may further include operations, features, means, or instructions for assigning a second page state to the page of the cache based on mapping the descriptor to the page of the cache, where the second page state indicates that the page includes a mapping between a logical address and physical address of the memory system.

Some examples of the method 900 and the apparatus described herein may further include operations, features, means, or instructions for initializing a timer associated with the descriptor based on mapping the descriptor to the page of the cache, where the timer indicates a duration the page may be active, where the page may be available to be recycled based on the timer satisfying a threshold value.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory system including memory configured as a cache and a controller coupled with the memory system, where the controller is configured to identify a descriptor indicating a page of the cache based on a read request for data from a block of a logical unit of a memory system, where the read request includes a logical address associated with the block and the cache includes page space for mappings between logical addresses and physical addresses of the memory system, determine whether the page indicated by the descriptor includes a mapping between the logical address associated with the block and a physical address of the memory system, and issue a read command to the memory system including the physical address of the memory system based on determining that the page space indicated by the descriptor includes the mapping between the logical address associated with the block and the physical address of the memory system.

Some examples may further include identifying a second read request for data from a second block of a second logical unit of the memory system, identify a second descriptor indicating a second page of the cache based on a logical address associated with the second block, determine that the second page indicated by the second descriptor does not include a mapping between the logical address associated with the block and a physical address of the memory system, and identify a page state indicated by the second descriptor based on determining that the second page indicated by the descriptor does not include the mapping between the logical address associated with the second block and the physical address of the memory system, where a second read command may be issued to the memory system based on the descriptor indicating a first page state.

Some examples may further include determining that the second descriptor does not indicate the first page state, increment a read counter associated with the second descriptor based on determining that the second descriptor does not indicate the first page state, where the read counter indicates a quantity of read operations performed on the second block, and determine whether a value of the read counter satisfies a threshold value based on incrementing the read counter, where the logical address associated with the second block may be issued to the memory system based on the value of the read counter failing to satisfy the threshold value.

Some examples may further include determining whether the second descriptor indicates a second page state based on the value of the read counter satisfying the threshold value, determine whether the cache includes an inactive page based on determining that the second descriptor does not indicate the second page state, and map the second descriptor to an inactive page of the cache based on determining that the cache includes at least one inactive page.

An apparatus is described. The apparatus may include a memory system including memory configured as a cache and a controller coupled with the memory system, where the controller is configured to determine that a descriptor associated with a block is not associated with a page of the cache based on identifying a read request for data from the block of the logical unit of the memory system, the read request including a logical address associated with the block, determine whether a page space of the cache includes an inactive page based on determining that the descriptor associated with the read request is not associated with a page of the cache, where the page space of the cache is shared across a set of logical units, and map the descriptor to a page of the cache based on determining that the page was inactive.

Some examples may further include identifying a second read request for data from a second block of a second logical unit of the memory system, determine a page state of a second page indicated by a second descriptor, and recycle the second page of the cache associated with the second descriptor based on the second descriptor indicating a first page state, where the descriptor may be mapped to the second page based on recycling the second page.

Some examples may further include identifying a second read request for data from a second block of a second logical unit of the memory system, determine a value of a timer of a second descriptor, determine whether the value of the timer of the second descriptor satisfies a threshold value, and recycle a second page of the cache associated with the second descriptor based on the timer satisfying the threshold value, where the descriptor may be mapped to the second page based on recycling the second page.

Some examples may further include initializing a timer associated with the descriptor based on mapping the descriptor to the page of the cache, where the timer indicates a duration the page may be active, where the page may be available to be recycled based on the timer satisfying a threshold value.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

If used to describe a conditional action or process, the terms "if," "when," "based on," "based at least in part on," and "in response to," may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code comprising instructions which, when executed by a processor of a host system, cause the host system to:
   identify a descriptor indicating a page of a cache of the host system;
   determine whether the page indicated by the descriptor includes a mapping between a logical address associated with a block and a physical address of a memory system; and
   issue a read command to the memory system comprising the physical address of the memory system based at least in part on determining that a page space indicated by the descriptor includes the mapping between the logical address associated with the block and the physical address of the memory system.

2. The non-transitory computer-readable medium of claim 1, wherein the instructions, when executed by the processor of the memory system, further cause the host system to:
   identify a second descriptor based at least in part on a logical address associated with a second block; and
   determine whether the second descriptor is associated with a valid page of the cache.

3. The non-transitory computer-readable medium of claim 2, wherein the instructions, when executed by the processor of the memory system, further cause the host system to: issue a second read command to the memory system based at least in part on the second descriptor indicating a first page state.

4. The non-transitory computer-readable medium of claim 1, wherein the memory system is associated with a plurality of logical units associated with a quantity of descriptors for storing in the cache of the host system.

5. The non-transitory computer-readable medium of claim 4, wherein the cache of the host system comprises a shared space for storing address tables associated with the plurality of logical units of the memory system.

6. The non-transitory computer-readable medium of claim 1, wherein the descriptor is associated with an address of the page space of the page of the cache of the host system.

7. The non-transitory computer-readable medium of claim 1, wherein the instructions, when executed by the processor of the memory system, further cause the host system to:
   receive a request for data from a block of a logical unit of the memory system, wherein identifying the descriptor is based at least in part on receiving the request.

8. The non-transitory computer-readable medium of claim 1, wherein the cache comprises a page space for mappings between logical addresses and physical addresses of the memory system.

9. An apparatus, comprising:
   a memory system comprising memory configured as a cache; and
   a controller coupled with the memory system, wherein the controller is configured to cause the apparatus to:
      identify a descriptor indicating a page of the cache;
      determine whether the page indicated by the descriptor includes a mapping between a logical address associated with a block and a physical address of the memory system; and
      issue a read command to the memory system comprising the physical address of the memory system based at least in part on determining that a page space indicated by the descriptor includes the mapping between the logical address associated with the block and the physical address of the memory system.

10. The apparatus of claim 9, wherein the controller is further configured to cause the apparatus to:
    identify a second descriptor based at least in part on a logical address associated with a second block of the memory system; and
    determine whether the second descriptor is associated with a valid page of the cache.

11. The apparatus of claim 9, wherein the memory system is associated with a plurality of logical units of the memory system, wherein each logical unit is associated with a quantity of descriptors configured to be stored in the cache.

12. The apparatus of claim 11, wherein the cache comprises a single shared space for pages configured to store address tables associated with the plurality of logical units.

13. The apparatus of claim 9, wherein the descriptor identifies an address of the page space of the page of the cache.

14. The apparatus of claim 9, wherein the controller is further configured to cause the apparatus to:
    receive a request for data from a block of a logical unit of the memory system, wherein identifying the descriptor is based at least in part on receiving the request.

15. The apparatus of claim 9, wherein the cache comprises a page space for mappings between logical addresses and physical addresses of the memory system.

16. A non-transitory computer-readable medium storing code comprising instructions which, when executed by a processor of a host system, cause the host system to:
- identify a read request for data from a first block of a first logical unit of a memory system, the read request comprising a logical address associated with the first block;
- identify a plurality of active pages of a cache of the host system based at least in part on identifying the read request, wherein each active page of the plurality of active pages is associated with a respective descriptor;
- determine a page state of a first page indicated by a first descriptor associated with the read request; and
- recycle the first page of the cache associated with the first descriptor based at least in part on the first descriptor indicating a first page state, wherein the first descriptor is mapped to the first page based at least in part on recycling the first page.

17. The non-transitory computer-readable medium of claim 16, wherein the instructions, when executed by the processor of the host system, further cause the host system to:
- initialize a timer associated with the first descriptor based at least in part on recycling the first page of the cache associated with the first descriptor, wherein the timer indicates a duration the first page is active, wherein the first page is available to be recycled based at least in part on the timer satisfying a threshold value.

18. The non-transitory computer-readable medium of claim 17, wherein the instructions, when executed by the processor of the host system, further cause the host system to:
- determine a value of the timer associated with the first descriptor; and
- determine whether the value of the timer associated with the first descriptor satisfies the threshold value, wherein recycling the first page of the cache associated with the first descriptor is based at least in part on the timer satisfying the threshold value.

19. The non-transitory computer-readable medium of claim 16, wherein the instructions, when executed by the processor of the host system, further cause the host system to:
- track a quantity of inactive pages of the cache; and
- decrease a tracked quantity of inactive pages of the cache based at least in part on recycling the first page of the cache associated with the first descriptor.

20. The non-transitory computer-readable medium of claim 16, wherein the instructions, when executed by the processor of the host system, further cause the host system to:
- assign a second page state to the first page of the cache based at least in part on recycling the first page of the cache associated with the first descriptor, wherein the second page state indicates that the first page comprises a mapping between a logical address and physical address of the memory system.

* * * * *